Sept. 26, 1939.   L. J. JEDLICKA   2,174,465
RUNNING GEAR
Filed Feb. 2, 1937   2 Sheets-Sheet 1
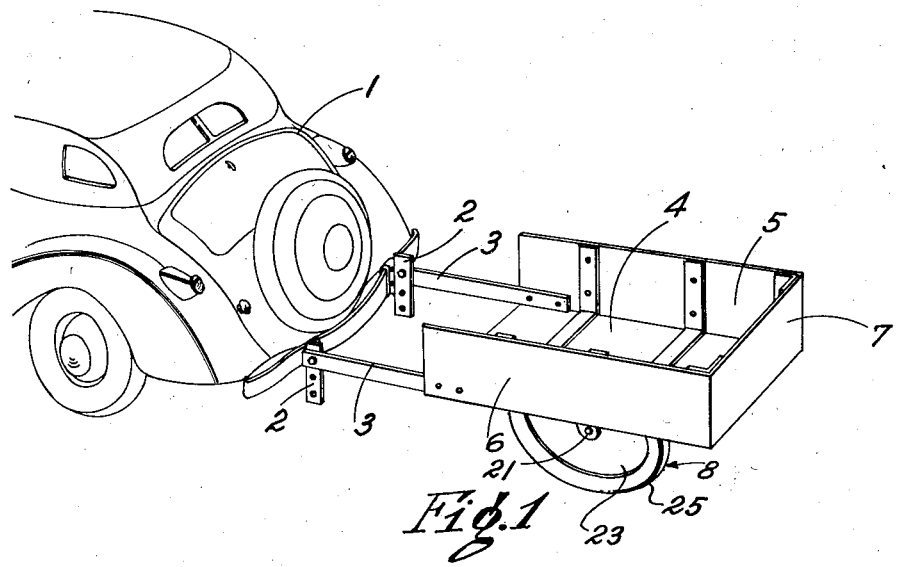
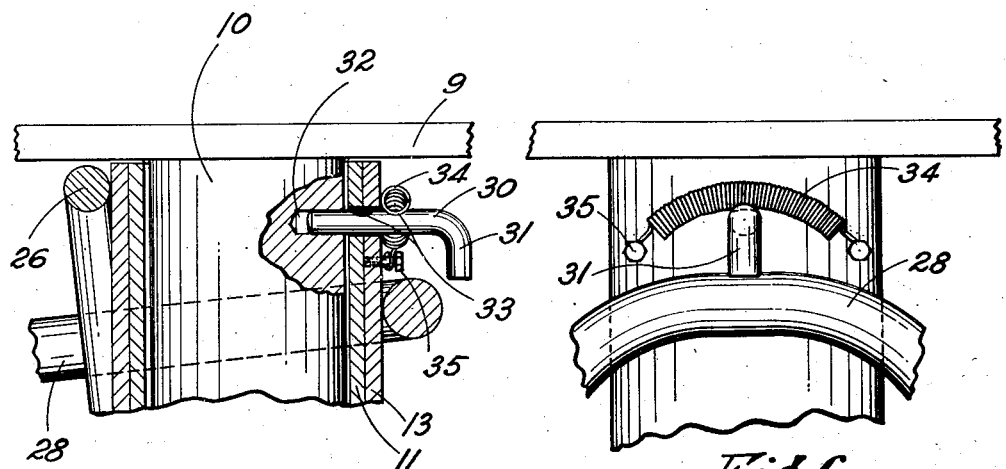
Louis J. Jedlicka, Inventor
By Hawgood and Van Horn
Attorneys Sept. 26, 1939.　　　L. J. JEDLICKA　　　2,174,465
RUNNING GEAR
Filed Feb. 2, 1937　　　2 Sheets-Sheet 2
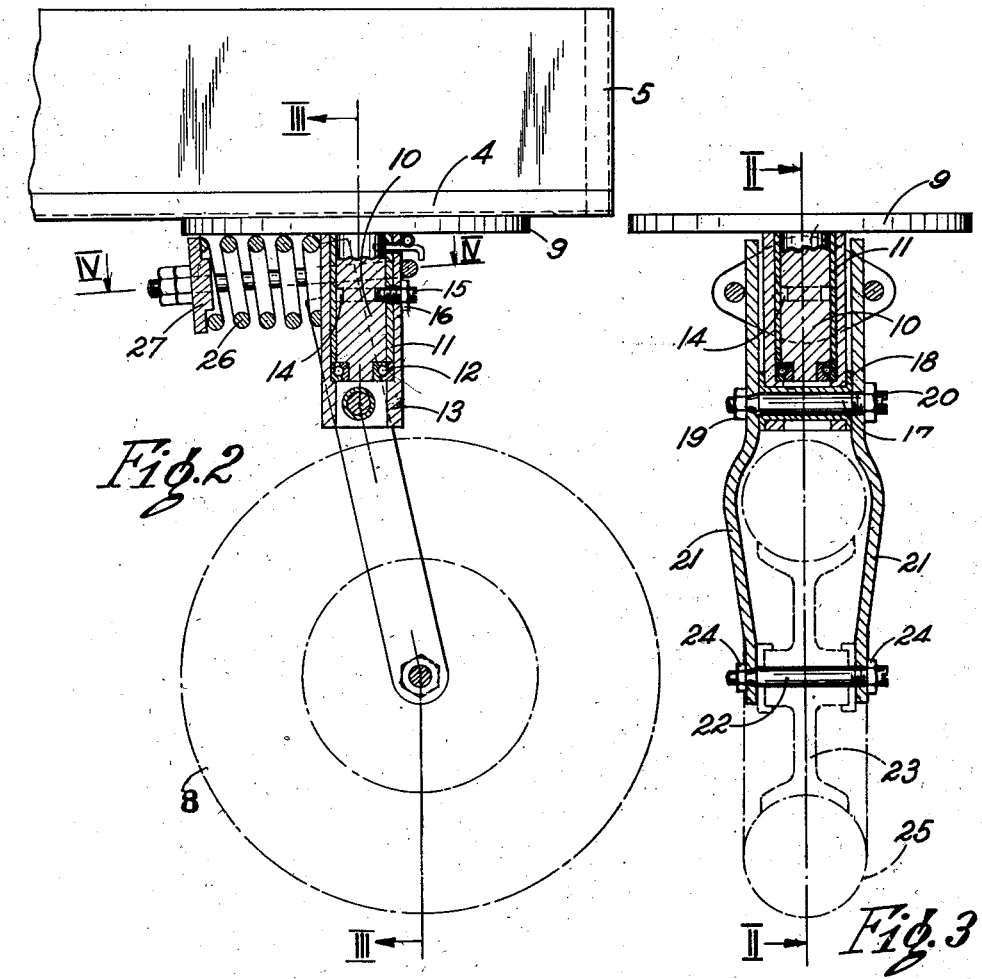

Patented Sept. 26, 1939

2,174,465

UNITED STATES PATENT OFFICE 2,174,465

RUNNING GEAR

Louis J. Jedlicka, Cleveland, Ohio

Application February 2, 1937, Serial No. 123,721

5 Claims. (Cl. 16—44)

This invention relates to running gear and is particularly applicable to use on such vehicles as trailers which are towed behind other vehicles, although it may be used in many other devices.

An object of the invention is to provide an improved connection between a wheel or the like and the load carried thereby.

Another object is to provide an improved connection between a wheel or the like and the load carried thereby, in which the wheel may move about a vertical axis relative the load.

Another object is to provide an improved connection between a wheel or the like and the load carried thereby in which the wheel may be selectively permitted to move about a vertical axis or prevented from rotation thereabout.

Another object is to provide an improved connection between a wheel or the like and the load carried thereby which will effectively preclude shocks from being transmitted from the wheel to the load.

Another object is to provide an improved connection between a wheel or the like and the load carried thereby which will be efficient in operation.

Another object is to provide an improved connection between a wheel or the like and the load carried thereby which may be easily and economically manufactured.

Another object is to provide an improved connection between a wheel or the like and the load carried thereby which will be simple and rugged in construction.

Other objects will hereinafter appear.

The invention will be better understood from the description of one practical embodiment thereof, illustrated in the accompanying drawings, in which:

Figure 1 is a perspective view of a trailer-like vehicle, incorporating one embodiment of my invention;

Figure 2 is a longitudinal central sectional view of the running gear of Figure 4, parts of the vehicle being shown in fragmentary elevation;

Figure 3 is a transverse sectional view taken on the line III—III of Figure 2;

Figure 4 is a substantially horizontal fragmentary sectional view taken on the line IV—IV of Figure 2;

Figure 5 is an enlarged sectional view, parts being shown in elevation, and parts being broken away, of the locking mechanism, and corresponding to a portion of Figure 2; and Figure 6 is an elevational view of the parts of Figure 5, taken from the right hand side of the latter mentioned figure.

In Figure 1, an automotive vehicle is indicated generally at 1, this having attached, as upon the rear bumper brackets, two plates 2 provided with a plurality of holes to which may be connected shafts 3 of a one-wheel trailer. This trailer is shown as consisting of a bottom 4 having a substantially horizontal surface 4, sides 5 and 6, an end 7, and is supported on running gear indicated generally in Figure 1 at 8 and which is shown in more detail in, and described in conjunction with, the succeeding figures.

Directly beneath the bottom 4 of the trailer is a horizontal metal disc 9, which has formed integrally with it a vertical pivot or pintle 10 about which the running gear parts attached to the wheel may rotate.

A bearing sleeve 11 surrounds the pintle, terminating at its lower end adjacent a shoulder formed about the lower end of the pintle, against which shoulder rests the inner or upper race of a ball bearing 12. The outer or lower race of the ball bearing bears upon an internal shoulder formed in a sleeve 13 rotatable about the bearing sleeve 11.

An annular recess 14 is formed in the pintle above the ball bearing and receives a set screw 15, threaded through the sleeve, and held by lock nut 16, and prevents the sleeve from sliding off the pintle if the box of the trailer is lifted or jolted upwardly as in running over a bump.

A transverse pin 17 is journalled in a bushing 18 in the lower part of the sleeve 13.

Secured to the ends of the pin, as by nuts 19 and 20, are two arms 21, between the lower ends of which extends pin 22 which serves as an axle for a wheel 23, the pin 22 being held within the ends of the arms by nuts 24. The wheel is preferably provided with pneumatic or other resilient tire 25, both wheel and tire being of any desired or well known construction, and it being understood that any suitable bearings may be interposed between the wheel and its axle 22.

The upper ends of arms 21 bear upon the end of a coil compression spring 26, the other end of which abuts against a plate 27, provided with an inwardly projecting pilot portion which prevents the spring from slipping off the plate.

This plate is held by a U-bolt 28 passing about the exterior of sleeve 13, and provided on its ends with threaded portions and nuts 29 to retain the plate and permit adjustment of the tension on the spring.

It will be noted that the axle 22 is only slightly to the rear of the axis of pintle 10, and that the load is transmitted almost directly by compression through the arms 21 to the axle. The positioning of the wheel axis only slightly behind the axis of the pintle provides ample castor action to cause the wheel to effectively trail behind the propelling vehicle at all times, irrespective of turns, "backing up", and the like, without, however, introducing any substantial bending stresses in arms 21.

In ordinary use, the trailer is attached, as shown in Figure 1, to an automobile, by means of two bolts passing through holes in the ends of shafts 3 and plates 2.

When, however, it is desired to remove the trailer from the vehicle, the castor-like swivel of sleeve 13 on the pintle is not desired, and to obviate this, I have provided a lock which consists of a bolt 30, having a handle 31, slidable radially through sleeve 13 and bushing 11 into a hole 32 formed in pintle 10.

This bolt is provided on its upper surface with two grooves 33 either of which may be selectively engaged by coil tension spring 34 having its ends secured as at 35 to the outside of sleeve 13.

When the locking bolt is pulled outwardly so that the spring engages the inner notch thereof, the sleeve 13 is free to pivot about the pintle, but when the bolt is pressed inwardly in the hole 32 and retained by the spring engaging the outer notch, the wheel is locked in position and the entire trailer may be handled by the shafts in precisely the manner of the ordinary wheelbarrow and may be therefore much more conveniently moved about than if the wheel were permitted to operate with its normal castor-like action.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. A running gear comprising a substantially horizontal disc, a depending cylindrical pintle formed integrally therewith, the pintle having its lower end reduced, an anti-friction bearing seated against the lower end of the pintle, a sleeve surrounding the pintle and bearing upon said anti-friction bearing, retaining means holding the sleeve in position on said pintle, a bushing extending diametrically through said sleeve, a pin passing through said bushing, a pair of arms pivoted intermediate their ends on said pin, a wheel axle connected to the lower ends of said arms, a U-bolt embracing said sleeve, a plate adjustably carried by the ends of said U-bolt, and a coil compression spring between said plate and the upper ends of said arms.

2. Running gear comprising a part adapted to be fixed to the frame of a vehicle, a part pivoted thereto and movable about a substantially vertical axis, a lever pivoted to said second mentioned part, an axle secured to said lever, a wheel mounted on the axle, an abutment carried by said second mentioned part, supporting means between the abutment and the second mentioned part, resilient means interposed between said abutment and said second part, one end of the lever being positioned selectively to engage said resilient means or the abutment supporting means.

3. Running gear comprising a member adapted to be fixed to a vehicle frame and provided with a substantially vertical pintle, a sleeve rotatably mounted on the pintle, a lever pivoted to said sleeve, an axle secured to the lever, a wheel journalled thereon, an abutment member, supporting means connecting said abutment member to said sleeve and limiting its motion with respect thereto, a spring interposed between the abutment member and the sleeve, the end of the lever being positioned selectively to engage either the spring or the supporting means.

4. Running gear comprising a member adapted to be fixed to a vehicle frame and provided with a substantially vertical pintle, a sleeve rotatably mounted on the pintle, a lever pivoted to said sleeve, an axle secured to the lever, a wheel journalled thereon, an abutment member, a U-bolt connecting said abutment member to said sleeve and limiting its motion with respect thereto, a spring interposed between the abutment member and the sleeve, the end of the lever being positioned selectively to engage either the spring or the U-bolt.

5. Running gear comprising a member adapted to be fixed to a vehicle frame and provided with a substantially vertical pintle, a sleeve rotatably mounted on the pintle, a lever pivoted to said sleeve, an axle secured to the lever, a wheel journalled thereon, an abutment member, a U-bolt connecting said abutment member to said sleeve and limiting its motion with respect thereto, a spring interposed between the abutment member and the sleeve, the end of the lever being positioned selectively to engage either the spring or the U-bolt whereby motion of the lever from its normal position in either direction will be resisted by compression of the spring.

LOUIS J. JEDLICKA.